United States Patent [19]
Hansen et al.

[11] Patent Number: 5,969,898
[45] Date of Patent: Oct. 19, 1999

[54] METHOD AND SYSTEM FOR READING DATA THAT IS UNREADABLE BY A TAPE DRIVE

[75] Inventors: Douglas C. Hansen; Frederick A. McLean, both of Boulder, Colo.

[73] Assignee: Storage Technology Corporation, Louisville, Colo.

[21] Appl. No.: 08/942,040

[22] Filed: Oct. 1, 1997

[51] Int. Cl.⁶ .................................................. G11B 21/02
[52] U.S. Cl. .................................... 360/77.16; 360/77.13; 360/76; 360/77.12
[58] Field of Search .......................... 360/77.12, 77.13, 360/77.16, 77.17, 76, 78.05

[56] References Cited

U.S. PATENT DOCUMENTS

| | | | |
|---|---|---|---|
| 4,688,109 | 8/1987 | Sangu | 386/79 |
| 5,191,491 | 3/1993 | Zweighaft | 360/77.13 |
| 5,349,481 | 9/1994 | Kauffman et al. | 360/74.4 |
| 5,521,769 | 5/1996 | Suga et al. | 360/70 |

OTHER PUBLICATIONS

Azuma et al., "Microprocessor Controlled Variable Play--Back Speed System for Video Tape Recorder", IEEE Transactions on Consumer Electronics, vol. CE–26, pp. 121–122, Feb. 1980.

*Primary Examiner*—Aristotelis M. Psitos
*Assistant Examiner*—Dan I. Davidson
*Attorney, Agent, or Firm*—Brooks & Kushman P.C.

[57] ABSTRACT

A method and system for reading data containing errors due to curved or displaced tracks in a track region reproduced by reproducing heads in a tape drive includes a signal processing circuit for sensing a first set of parameters associated with the data at a first head position at predetermined points along each track in the region. The signal processing circuit also senses a second set of parameters associated with the data at a second head position different from the first head position at the predetermined points along each track in the region. A movable head controller positions the reproducing heads to follow the curved or displaced tracks based on the first and second head positions and the first and second set of parameters.

14 Claims, 3 Drawing Sheets

METHOD AND SYSTEM FOR READING DATA THAT IS UNREADABLE BY A TAPE DRIVE

TECHNICAL FIELD

This invention relates to methods and systems for reading data that is unreadable by a tape drive using current state of the art methods.

BACKGROUND ART

The helical systems of recording digital data on magnetic tape include a fixed head system which forms recording tracks in the longitudinal direction on magnetic tape by means of fixed heads and a helical scan system which forms recording tracks slantwise with respect to the longitudinal direction of the magnetic tape by means of rotary heads. The helical scan system is useful for high density recording and high speed data transfer.

When data is recorded onto the magnetic tape, the data is not written verbatim because of the importance of data integrity. Instead, additional characters are calculated and added to the data as it is written. This process, known as Error Correction Coding (ECC), allows the original data to be reconstructed at a later date even if a small number of data bits become damaged and unreadable.

When the helical system is instructed to read a certain file, the system positions the magnetic tape at the beginning of the file of interest and begins reading the data. The ECC is used to check the integrity of the data and correct any errors that are very short in duration. The system will stop reading the data and rewind to the beginning of the error region when the error is too long in duration for the ECC to correct. Then the system will attempt to reread the data in the error region. Most read errors are caused by debris contaminating the read heads. The debris is often dislodged during the reread attempt which makes the data readable. The reread operation is attempted again if the data remains unreadable. The system will quit after a certain number of retries and indicate that the data is unrecoverable.

Sometimes all the data, or a large fraction of the data, becomes unreadable for several seconds due to the fact that the recorded helical data tracks are curved rather than straight or are displaced from their specified locations. This occurs when the edge of the tape is damaged or when debris contaminates the guides in the tape path. Most practical error correction codes are only able to correct very short and intermittent data errors. A long error, however, is generally not correctable by ECC because the data tracks are not located where the tape drive attempts to read them.

DISCLOSURE OF THE INVENTION

It is thus a general object of the present invention to provide a method and system for reading data that is unreadable due to curved or displaced data tracks.

In carrying out the above object and other objects, features, and advantages of the present invention, a method is provided for reading data reproduced by reproducing heads in a tape drive wherein the data contains errors due to curved or displaced tracks in a track region. The method includes the step of sensing a first set of parameters associated with the data at a first head position at predetermined points along each track in the region. The method also includes the step of sensing a second set of parameters associated with the data at a second head position different from the first head position at predetermined points along each track in the region. Finally, the method includes the step of positioning the reproducing heads to follow the curved or displaced track based on the first and second head positions and the first and second set of parameters.

In further carrying out the above object and other objects, features, and advantages of the present invention, a system is also provided for carrying out the steps of the above described method. The system includes a signal processing circuit for sensing the first set of parameters at the first head position at the predetermined points along each track in the region and for sensing the second set of parameters at the second head position at the predetermined points along each track in the region. The system also includes a movable head controller for positioning the reproducing heads to follow the curved or displaced track based on the first and second head positions and the first and second set of parameters.

The above object and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
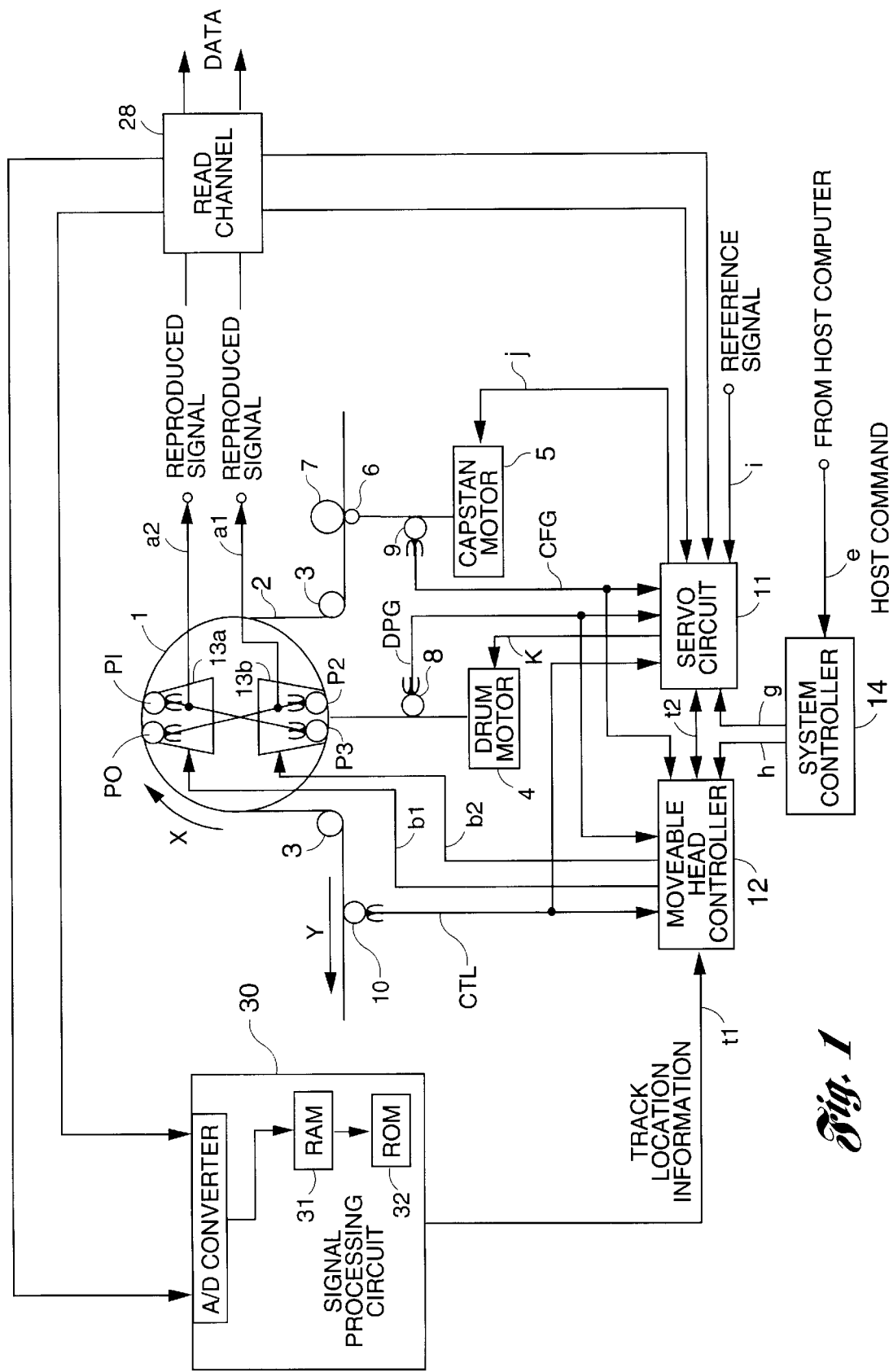
FIG. 1 is a block diagram illustrating a magnetic tape unit according to the present invention.

Turning now to FIG. 1, there is shown a block diagram of a helical tape system utilized in the present invention. The system includes reproducing heads P0, P1, P2 and P3, rotary drum 1, magnetic tape 2, tape guides 3, drum motor 4, capstan motor 5, capstan 6, pinch roller 7, drum pulse generator 8, capstan frequency generator 9, control head 10, servo circuit 11, movable head 12, displacement elements 13a and 13b, and system controller 14.

The magnetic tape 2 is wound around the rotary drum 1 in a circular arc of about 180 degrees by means of the tape guides 3 for running. The rotary drum 1 is provided with the displacement elements 13a and 13b opposed to each other. The reproducing heads P0 and P1 are mounted on the displacement element 13a and the reproducing heads P2 and P3 are mounted on the displacement element 13b. Each time the rotary drum rotates half a revolution, the reproducing heads P0, P1, P2 and P3 scan the magnetic tape 2 for reproduction alternately, i.e., reproducing heads P0 and P1 read the tape for a half revolution, P2 and P3 read the tape on the following half revolution, etc. Signals a1 and a2 are generated by reproducing heads P0 and P2 and P1 and P3, respectively. The signals a1 and a2 are amplified, filtered and processed by read channel 28 to obtain a digital data stream.

The reproducing heads P0 and P2 have the same azimuth and the reproducing heads P1 and P3 have the same azimuth, but opposite from the azimuth of P0 and P2.

Figure 2:
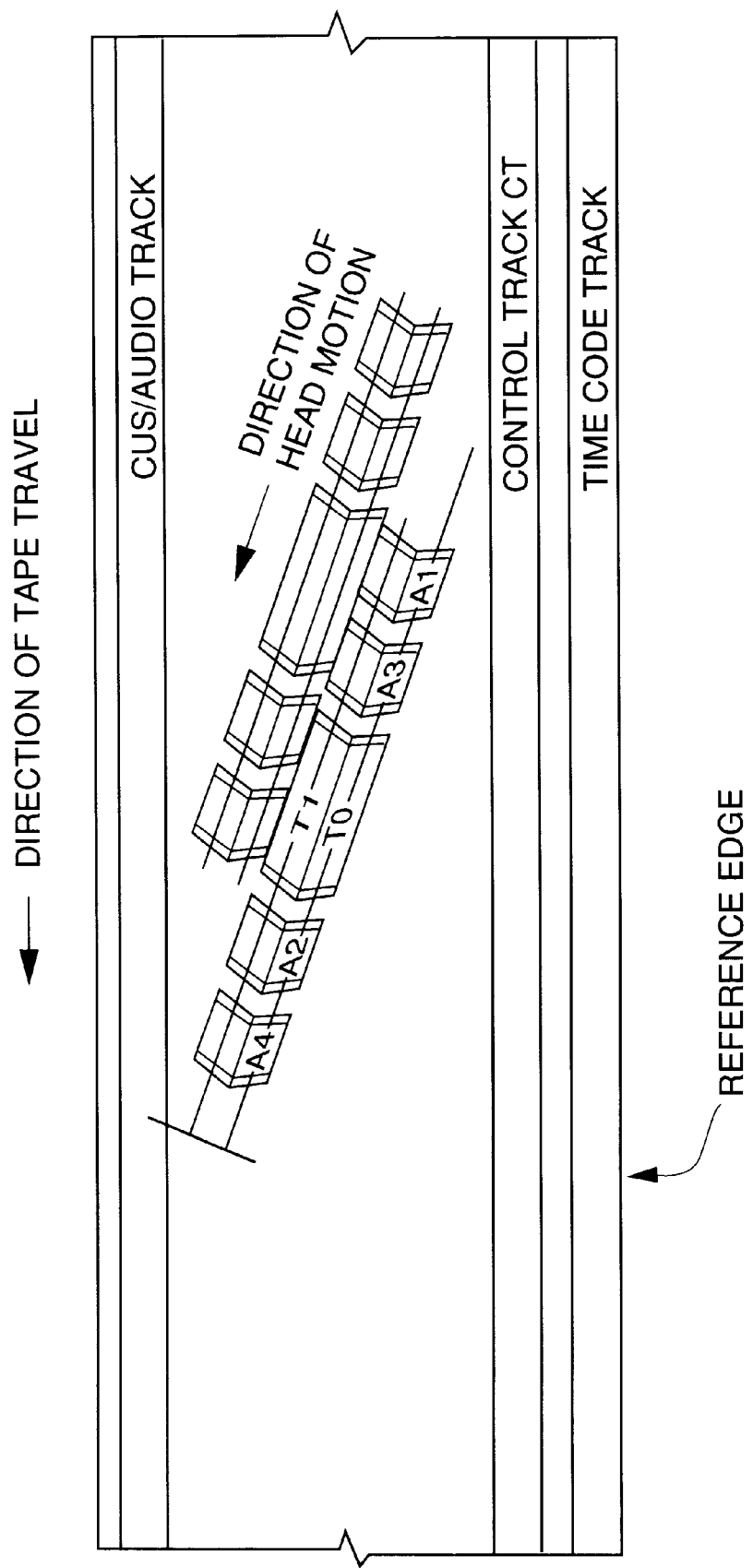
FIG. 2 is schematic diagram showing a track pattern of magnetic tape used with the unit shown in FIG. 1.

FIG. 2 is a schematic diagram showing an example of a track pattern of the magnetic tape 2 in FIG. 1, wherein T0 and T1 are track numbers. The reproducing heads P0 and P2 scan alternate data tracks T0, T2, T4, . . . having the same azimuth as the reproducing heads in sequence for reproduction, and generate data signals recorded on the tracks as reproduced signals a1. The reproducing heads P1 and P3 scan data tracks T1, T3, T5, . . . having the same azimuth as the reproducing heads in sequence for reproduction, and generate data signals recorded on the tracks as reproduced signals a2.

Control track CT is a track formed in the longitudinal direction of the magnetic tape 2. The control track CT contains a digital tachometer signal; one tachometer cycle corresponds to two track pairs of helical data. The control track allows synchronization of the tape feed and the rotation of the reproducing heads during recording so as to fit the relationship between tape feed and rotation of the reproducing heads during reproduction of that recording.

Referring again to FIG. 1, the displacement elements 13a and 13b, which are controlled by movable head control signals b1 and b2 from the movable head controller 12, displace the reproducing heads P0 and P1 or P2 and P3 in the plane of the tape in a direction perpendicular to the helical track angle. The rotary drum 1 is rotated in the X direction by the servo circuit 11 which drives the drum motor 4. The magnetic tape 2, which is put between the capstan 6 and pinch roller 7, is run by the servo circuit 11 which drives the capstan motor 5. In recording or normal reproducing, the magnetic tape 2 runs in the Y direction.

The system controller 14 controls the entire system and comprises a microcomputer. Normally, it gives a servo instruction g to the servo circuit 11 and a movable head controller instruction h to the movable head controller 12 in response to host commands e from a host computer (not shown). However, the system controller 14 may determine operation as a stand alone system, independently of the host command e.

The analog reproduced signal a1 from the reproducing P0 and P2 and the analog reproduced signal a2 from the reproducing heads P1 and P3 are supplied to servo circuit 11 which then generates and outputs track location information t2.

When a read command (host command e) is given to the system controller 14, the system controller 14 gives a servo instruction g to the servo circuit 11 and a movable head controller instruction h to the movable head controller 12 for the reproduction operation.

The servo circuit 11 controls the rotation operation of the rotary drum 1, the run operation of the magnetic tape 2, and the displacement elements 13a and 13b. They are described as follows. First, rotation control of the rotary drum 1 will be discussed. When the rotary drum 1 is rotated by the drum motor 4, the drum pulse generator 8 with which the drum motor 4 is provided generates a drum pulse signal DPG of a constant phase to rotation of the rotary drum 1 for every revolution of the rotary drum 1. The drum pulse signal DPG is fed into the servo circuit 11 where the phase of the signal DPG is compared with the phase of an external reference signal i having a constant stable period to generate a drum control signal k. Then, the drum control signal k is fed into the drum motor 4, thereby performing the servo system control operation of the rotary drum 1 so that the drum pulse signal DPG always has the constant phase relationship with the reference signal i.

Next, run control of the magnetic tape 2 will be discussed. To do this, the rotation speed and phase of the capstan 6 are controlled. The rotation speed of the capstan 6 is controlled for running the magnetic tape 2 at a certain speed and the rotation phase of the capstan 6 is controlled to maintain the positional relationship between the reproducing heads P0–P3 and magnetic tape 2 for correct nominal tracking of the reproducing heads P0–P3.

To control the rotation speed of the capstan 6, the servo circuit 11 uses a capstan frequency signal CFG of a frequency proportional to the rotation speed of the capstan 6, generated by the capstan frequency generator 9 with which the capstan motor 5 is provided. The run speed of the magnetic tape 2, which is proportional to the rotation speed of the capstan 6, can be detected by detecting the frequency of the capstan frequency signal CFG. The run speed of the magnetic tape 2 is specified by a servo instruction g from the system controller 14. The servo circuit 11 feeds a capstan control signal j to the capstan motor 5 so that the capstan frequency signal CFG becomes the frequency corresponding to the target run speed of the magnetic tape 2 specified by the servo instruction g for controlling the rotation speed of the capstan motor 5.

To control the rotation phase of the capstan 6, the servo circuit 11 uses a control signal CTL reproduced from a control track CT of the magnetic tape 2 formed as shown in FIG. 2 by the control head 10; it compares the phase of the control signal CTL with the phase of a reference signal i and feeds a capstan control signal j to the capstan motor 5. The control signal CTL is recorded on the control track CT as a digital signal with one CTL cycle for every two helical track pairs. During normal reproduction, the servo circuit 11 controls the phase of the capstan motor 5 by the capstan control signal j so that the control signal CTL is synchronized to with reference signal i. p.16.

Next, control of the displacement elements 13a and 13b will be discussed. The servo circuit 11 determines the shape of the helical tracks from the reproduced signals a1 and a2. Several methods for doing this are in common use. One method is to dither the displacement elements 13a and 13b in the plane of the tape and in a direction perpendicular to the helical track angle and determine the head position that produces the greatest reproduced signal amplitude. Another method is to incorporate special data signals at the exact same location on adjacent tracks. The track shape can be determined from the timing difference between the special signals read by P0 and P1 (or P2 and P3). All of the methods currently used respond slowly and respond to a limited amount of track curvature. These methods are adequate for following the slightly curved or displaced tracks that commonly occur. The track shape, as determined by the s ervo circuit 11 (FIG. 1), is then output to the movable head controller 12 which amplifies the servo signals and drives the displacement transducers 13a and 13b.

When the magnetic tape 2 is run at a speed different from the normal reproduction speed, the scan directions of the reproducing heads P0–P3 do not match the slope direction of the data tracks T0 and T1. Since the run direction of the reproducing heads P0–P3 is determined uniquely by the run speed of the magnetic tape 2, the movable head controller 12 detects the run speed of the magnetic tape 2 and generates movable head control signals b1 and b2 in response to the detected run speed to control the displacement elements 13a and 13b for correcting the shift of the run direction of the reproducing heads P0–P3 with respect to the slope direction of the data tracks T0 and T1. The run speed of the magnetic tape 2 is detected by detecting the cycle of the capstan frequency signal CFG as with the servo circuit 11. The movable head control signals b1 and b2 as correction signals of the run directions of the reproducing heads P0–P3 become triangular wave signals synchronized with the drum pulse signal DPG, and the slope of the triangular wave is determined by the run speed of the magnetic tape 2.

An unreadable section of the tape is first identified after the tape drive receives a host command to read a certain file on the tape. The tape drive positions the tape at the beginning of the file of interest. Then the drive begins to read the file using the normal read process. The transport uses the Error Correction Code to check the data as it is being read. When the number or errors in the data exceed the number than can be corrected by the ECC, the transport rewinds to the beginning of the errors and attempts a reread (because of the possibility that debris on the head caused the errors). The maximum number of retries will be attempted and then the tape drive will quit.

Figure 3:
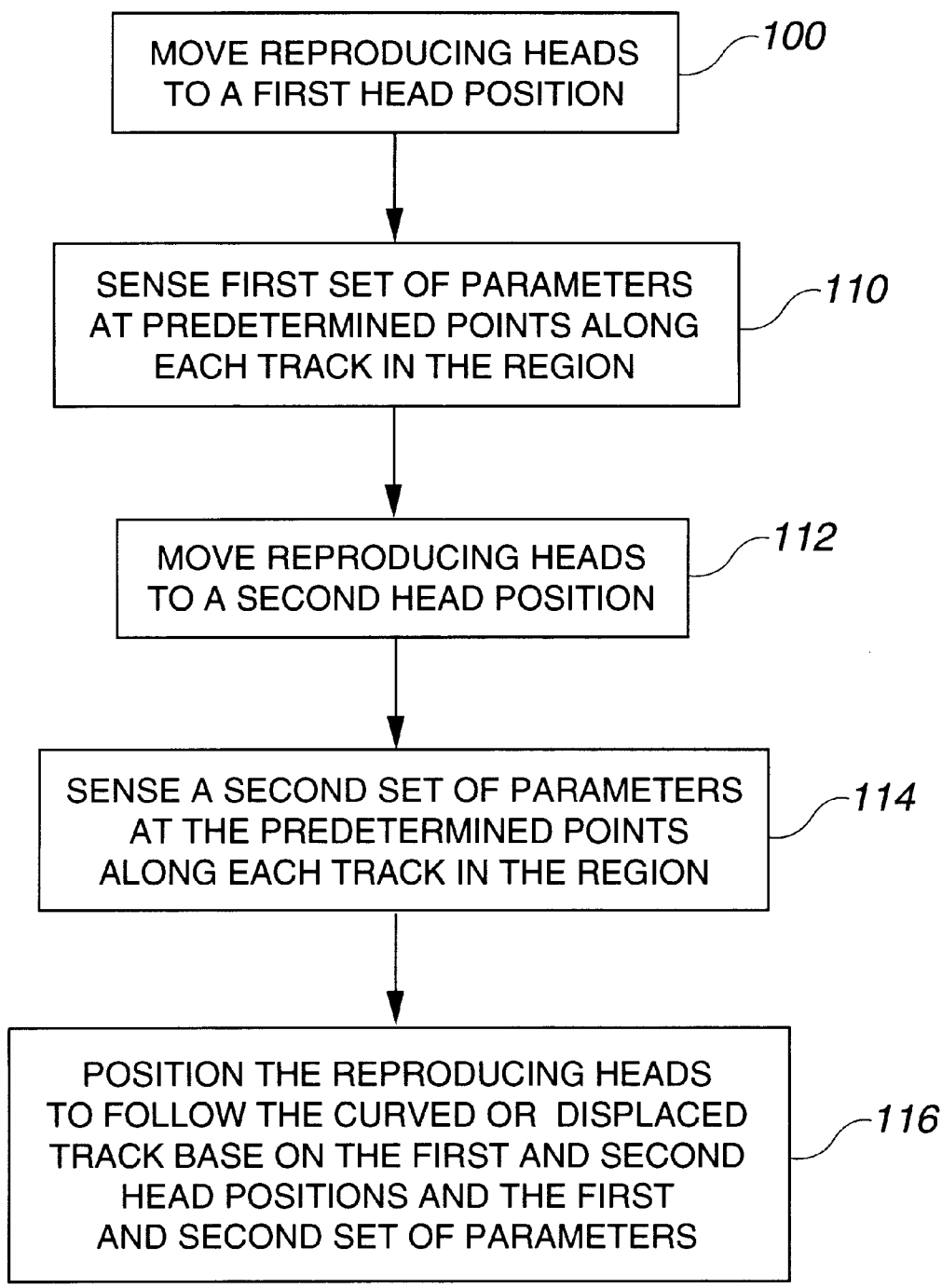
FIG. 3 is a flow diagram illustrating the general sequence of steps associated with the operation of the present invention.

The present invention is then initiated and will be described in conjunction with the flow diagram of FIG. 3. The reproducing heads P0–P3 are moved to a first head position via movable head controller 12 as instructed by signal processing circuit 30, as shown at block 100. Preferably, this step is performed after the tracking servo in the servo circuit 11 has been disabled. The first head position is preferably a predetermined distance from one side of the center nominal position of the reproducing head. The predetermined distance is preferably equal to ¼ of a track width.

With the reproducing heads P0–P3 positioned at their first head position, parameters associated with the reproduced signals a1 and a2 are sensed and recorded at predetermined points along every track in the curved track region, as shown at block 110. In an azimuth recording format, the amplitude of the reproduced signals a1 and a2 are sensed. This is due to the fact that heads in an azimuth recording system are able to reproduce their corresponding track but not the adjacent tracks. Thus, the amplitude decreases as the head moves off its corresponding track and onto the adjacent track. In this case, the amplitudes are preferably sensed at 32 equally spaced points. In a non-azimuth recording system, some other parameter may be sensed and recorded. These parameters are then stored in a Random Access Memory (RAM) 31 in the signal processing circuit 30.

The reproducing heads P0–P3 are then repositioned, as shown at block 112, at a second head position different from the first head position. The second head position is preferably a second predetermined distance from the other side of the center nominal position than the first head position. The second predetermined distance is also preferably equal to ¼ of a track width.

The tape is then rewound to the beginning of the curved track region, and the parameters are sensed again, as shown at block 114. These parameters are also stored in RAM 31.

Finally, the tape is rewound and positioned at the beginning of the region containing the unreadable data. The data is reread while the reproducing heads P0–P3 are moved dynamically to follow the correct locations of the predetermined points, as shown at block 116. The correct location of each of the predetermined points is determined dynamically in real-time.

The correct location of each of the predetermined points in the curved track region is determined according to an empirically derived look-up table stored in a Read Only Memory (ROM) 32 of signal processing circuit 30. Based on the first and second set of parameters stored in RAM 31 and the first and second head positions in which the reproducing heads P0–P3 were moved, the true track location can be determined.

The data envelope amplitude is a function of the overlap between the data tracks and the reproducing heads P0–P3. The data envelope amplitude is maximum when the reproducing heads P0–P3 are located directly over their corresponding (matching azimuth) data track. The data envelope amplitude is minimum when the reproducing heads P0–P3 are offset by one track width (over an opposite-azimuth track). The shape and location of the distorted tracks can then be calculated from the two sets of data envelope amplitude.

For example, let's assume the amplitude of the reproduced signals a1 and a2 is normally 1 volt and the width of one track is 20 microns. In this example, the first head position is 5 microns to the right of the nominal location, and the second head position is 5 microns to the left of the nominal location. If during the first step, the amplitude is 0.9 volt then the data track is misaligned by approximately 3 microns with respect to the head position. If during the second step, after the reproducing heads P0–P3 are moved in the left direction by the same amount, the amplitude is 0.2 volt indicating the data track is misaligned by 13 microns, it is discovered that the data track is misaligned by 13 microns with respect to the head position in either the right or left direction. Therefore, the unique track location that satisfies these two constraints is 3 microns to the right of the first head position, which is 8 microns to the right of the nominal location.

As the data is read, a track position signal, calculated above, is continuously output to the movable head controller 12 enabling the reproducing heads P0–P3 to follow the distorted tracks and recover the data.

Although operation of the present invention has been discussed in conjunction with a helical tape drive, it may be implemented with a longitudinal tape drive. Curved or displaced tracks become a problem when the tracks are very narrow and/or the tape is very thin. The tracks used in helical recording are very narrow, and the tape tends to be very thin. The next generation of longitudinal tape drives may have the same problem with curved and displaced tracks that today's helical tape drives do.

The fundamental advantage of the present invention is that the track shape and location is measured before the distorted data is finally read. The movable head controller can then respond to instantaneous changes in track shape and location. Traditional servos attempt to follow tracks in real-time and, therefore, lose lock when abrupt changes occur.

While the best modes for carrying out the invention have been described in detail, those familiar with the art to which this invention relates will recognize various alternative designs and embodiments for practicing the invention as defined by the following claims.

What is claimed is:

1. A method for reading data reproduced by reproducing heads in a tape drive, the data containing errors due to curved or displaced tracks in a track region having a predetermined width, the method comprising:
    sensing a first set of parameters associated with the data at a first head position within the predetermined width at predetermined points along each track in the region;
    sensing a second set of parameters associated with the data at a second head position within the predetermined width different from the first head position at the predetermined points along each track in the region; and
    positioning the reproducing heads to follow the curved or displaced tracks based on the first and second head positions and the first and second set of parameters.

2. The method as recited in claim 1 wherein positioning the reproducing heads includes comparing each of the first set of parameters with a corresponding one of each of the second set of parameters.

3. The method as recited in claim 1 wherein the reproducing heads have a center nominal position within the predetermined width and wherein sensing the first set of parameters includes sensing the first set of parameters at a first predetermined distance from the center nominal position and wherein sensing the second set of parameters includes sensing the second set of parameter at a second predetermined distance from the center nominal position.

4. The method as recited in claim 3 wherein the second predetermined distance is in an opposite direction from the center nominal position than the first predetermined distance.

5. The method as recited in claim 4 wherein the first and second predetermined distances are equal.

6. The method as recited in claim 1 including identifying the track region of the tape containing the error.

7. The method as recited in claim 6 wherein identifying the track region includes using an error correction code recorded originally with the data.

8. A system for reading data reproduced by reproducing heads in a tape drive, the data containing errors due to curved or displaced tracks in a track region having a predetermined width, the system comprising:

a signal processing circuit for sensing a first set of parameters associated with the data at a first head position within the predetermined width at predetermined points along each track in the region and sensing a second set of parameters associated with the data at a second head position within the predetermined width different from the first head position at the predetermined points along each track in the region; and a movable head controller coupled to the signal processing circuit for positioning the reproducing heads to follow the curved or displaced tracks based on the first and second head positions and the first and second set of parameters.

9. The system as recited in claim 8 wherein the signal processing circuit is further operative to compare each of the first set of parameters with a corresponding one of each of the second set of parameters.

10. The system as recited in claim 8 wherein the reproducing heads have a center nominal position within the predetermined width and wherein the first head position is at a first predetermined distance from the center nominal position and the second head position is at a second predetermined distance from the center nominal position.

11. The system as recited in claim 10 wherein the second predetermined distance is in an opposite direction from the center nominal position than the first predetermined distance.

12. The system as recited in claim 11 wherein the first and second predetermined distances are equal.

13. The system as recited in claim 8 further operative to identify the track region of the tape containing the error.

14. The system as recited in claim 13 wherein the system, in identifying the track region, is further operative to use an error correction code recorded originally with the data.

* * * * *